Patented June 19, 1951

2,557,474

UNITED STATES PATENT OFFICE 2,557,474

HEAT STABILIZATION OF VINYL POLYMERS AND COPOLYMERS

Albert Kenneth Sanderson, Welwyn Garden City, England, assignor to Imperial Chemical Industries Limited, a corporation of Great Britain No Drawing. Application February 10, 1948, Serial No. 7,518. In Great Britain February 21, 1947

13 Claims. (Cl. 260—45.7)

This invention relates to improvements in and relating to aqueous dispersions of polymers and copolymers of vinyl chloride and relates more particularly to processes for incorporating in dispersions of this type a substance or substances which improve the stability of vinyl chloride polymers and copolymers to the action of heat.

Emulsion polymerisation processes, that is processes in which substances are polymerised while in the form of an emulsion in water, result in the production of dispersions of polymeric material similar in appearance to rubber latex. These dispersions can be used as such either in the form in which they are obtained or after concentration, for example, in coating applications, or the polymeric material may be isolated as a solid, for example by removal of the aqueous phase in a spray-drier. Vinyl chloride polymer and copolymer compositions suffer from the disadvantage that they are decomposed with consequent discoloration when subjected to elevated temperatures, for example in ordinary processing operations, the extent of discoloration depending on the temperatures encountered and on the length of time the compositions are maintained at such temperatures. It is usual therefore, to incorporate in vinyl chloride polymer and copolymer compositions substances which tend to counteract this discoloration. Such substances are usually referred to as heat stabilisers. Various substances have previously been proposed as heat stabilisers for polymers and copolymers of vinyl chloride. A number of these stabilisers are electrolytes, and it is difficult to add such substances to aqueous dispersions of polymers and copolymers of vinyl chloride owing to the coagulating effect of electrolytes thereon. One particular class of heat stabiliser of this type consists of alkaline substances such as sodium carbonate. Sodium carbonate has previously been incorporated in compositions comprising polymers or copolymers of vinyl chloride by mixing, for example on rolls. Another method of incorporating sodium carbonate in polyvinyl compositions comprises spray-drying an aqueous dispersion of the polyvinyl compound obtained by emulsion polymerisation of vinyl chloride and at the same time spraying an aqueous solution of sodium carbonate in such a manner as to mix the sodium carbonate with the polyvinyl compound. It has previously been proposed to add sodium carbonate solution alone to a polyvinyl chloride dispersion, but it has been found that this process results in some coagulation, and that the coagulated material carried down some of the sodium carbonate. Furthermore, the resultant material has low mechanical stability and is therefore frequently difficult to spray-dry, particularly with spray-drying apparatus of the rotating-disc type. It has also been proposed to incorporate sodium carbonate by slurrying with precipitated polyvinyl chloride. In addition to sodium carbonate other electrolyte heat stabilisers for polymers and copolymers of vinyl chloride are known, including for example, sodium and potassium bicarbonates, sodium sulphide, sodium acetate, sodium nitrate and sodium nitrite.

An object of this invention is to provide an improved process for preparing compositions containing polymers and/or copolymers of vinyl chloride. Another object of this invention is to provide an improved process for preparing such compositions incorporating a substance or substances which stabilise vinyl chloride polymers and/or copolymers to heat. Yet another object of this invention is to provide a process for preparing compositions of the above-mentioned type incorporating a substance or substances which stabilise the vinyl chloride polymers and/or copolymers to heat wherein the heat stabilising substance consists, at least in part, of an electrolyte. A further object of the invention is to provide a process for incorporating in vinyl chloride polymers and copolymers compositions heat stabilisers which are also electrolytes in such a way that the said stabilisers are uniformly distributed throughout the said compositions. Another object of this invention is to provide a process for the preparation of polyvinyl compositions containing sodium carbonate. Yet another object is to provide a process for the preparation of dispersions of polymers and copolymers of vinyl chloride containing heat stabilisers. Other objects will appear hereinafter.

The above objects are accomplished according to the present invention by the provision of a process for the production of a composition comprising an aqueous dispersion of one or more polymers and/or copolymers of vinyl chloride containing an electrolyte heat stabilizer for said polymers and copolymers which consists in mixing an aqueous dispersion of one or more polymers and/or copolymers of vinyl chloride with an aqueous solution containing said electrolyte heat stabilizer and an emulsifying agent.

It is preferable that local concentration of the aqueous solution of heat stabilizer and emulsifying agent in the polymer dispersion should be avoided as far as possible, for example by stirring the dispersion whilst the stabilizer/emulsifying agent solution is being added. If this is not done some coagulation of the polymeric material occurs, although to a much smaller degree than that resulting from the addition of a solution containing electrolyte heat stabilizer and no emulsifying agent. Furthermore, as stated above, it is necessary to obtain a uniform distribution of the heat stabilizer in the polymer composition in order to attain maximum heat stabilization, and it is also necessary to obtain a uniform distribution of emulsifying agent throughout the polymer dispersion for the treated polymer dispersion to attain its greatest possible mechanical stability. If the heat stabilizer/emulsifying agent solution is merely added to the polymer dispersion without stirring the stabilizer and emulsifying agent do not become uniformly distributed throughout the dispersion until the mixture has been allowed to stand for some time.

Electrolyte heat stabilizers which may be used in the process of the invention include, for example, alkaline electrolytes such as soluble carbonates, e. g. sodium carbonate; bicarbonates, e. g. potassium bicarbonate; sodium percarbonate; borates; sodium sulphide; sodium acetate; phosphates, e. g. trisodium phosphate; nitrates and nitrites, e. g. sodium nitrate and sodium nitrite; sodium bromate and sodium chlorate. For optimum results the amount of electrolyte heat stabilizer used is preferably within the range of 0.1% to 1.0% by weight based on the weight of polymer of copolymer. Below 0.1% the stabilizing effect of the heat stabilizer is not appreciable, whereas above 1.0% little increased stabilizing effect is observed and the increased electrolyte content of the polymer or copolymer results in undesirably high water absorption.

In preparing the heat stabilizer/emulsifying agent solution it is of course essential to use an emulsifying agent whose activity is not destroyed by the electrolyte heat stabilizer. In some cases the emulsifying agent may react with the electrolyte heat stabilizer without losing its emulsifying activity, for example where the electrolyte heat stabilizer is alkaline by the neutralization thereby of acid groups in the emulsifying agent. In this way the emulsifying agent used in the heat stabilizer/emulsifying agent solution of the process according to the invention may be prepared in situ in said solution. Usually the amount of electrolyte heat stabilizer undergoing such reaction with emulsifying agent is very small, but if the amount is appreciable in any particular case the amount of electrolyte heat stabilizer employed must be sufficient for the balance of unreacted stabilizer to be equal to the amount required in the polymer composition.

Any emulsifying agent used must be soluble in water, preferably to an extent of at least 5% by weight so as to avoid the addition of a large amount of water to a polymer dispersion subjected to the process of the invention. The amount of emulsifying agent in the solution added to the polymer dispersion is preferably in the range of 0.1% to 1.0% based on the weight of polymer or copolymer, since below 0.1% the effect of the emulsifying agent in preventing coagulation of the polymeric material is not very pronounced and above 1.0% little increase in this effect is achieved and the water absorption of solid polymeric material isolated from the dispersion becomes undesirably high. Examples of suitable emulsifying agents include sulphonation or sulphation products of long-chain hydrocarbons, naphthalene/formaldehyde condensation products and castor oil (e. g. Turkey red oil), and soluble salts thereof, such as the sodium salts; the ammonium salt of sulphonated oleic acid; the sodium salt of sulphonated methyl oleate; and alkylated naphthalene sulphonates.

In addition to the electrolyte heat stabilizers certain other heat stabilizers, for example mono-phenyl urea and mono-phenylthiourea, may be added to the vinyl chloride polymer and copolymer dispersions in order to obtain an increased heat-stabilizing effect. Most of the non-electrolyte stabilizers, however, cannot be added to the dispersions with advantage in view of their insolubility in water. These other heat stabilizers may be incorporated in solid polymeric material obtained from the dispersions treated in accordance with the present invention.

Vinyl chloride polymer and copolymer dispersions prepared according to the process of the invention, owing to their mechanical stability, are even suitable for isolation of the polymeric material by spray-drying in machines of the rotating-disc type, where dispersions of low mechanical stability are liable to undergo coagulation.

It is desirable to add the electrolytes and emulsifying agents in the form of fairly concentrated aqueous solutions, so that as little water as possible is added.

The solid polymeric material prepared from the dispersions treated by the process of this invention, for instance by coagulation or spray-drying, may be used for any known purpose. Thus plasticisers may be incorporated in any known manner, or the polymeric material may be used in unplasticised form. Also if desired, other stabilisers may be incorporated in the polymeric material, for example by ball-milling. Examples of such additional stabilisers include aniline, urea, phenyl urea, urea oxalate, urea nitrate, urea hydroperoxide, thiourea, phenyl thiourea, diphenyl thiourea, ditolyl thiourea, allyl thiourea, benzylidine aniline and triethanolamine. The amount of such additional stabilisers used is preferably within the range of 0.1% to 2.0% based on the weight of polymer or copolymer. Below 0.1% the effect of these additional stabilisers is not appreciable, and above 2.0% there is no great increase in their stabilising effect. The solid polymeric material may be used to produce pastes and extrusion compositions. The process of the invention is particularly valuable in the preparation of polyvinyl chloride compositions for the production of plasticised and unplasticised transparent sheets by moulding. The dispersions treated by the process of the invention may themselves be used for any of the usual applications of such compositions, for example, for coatings, and in the production of leather cloth.

In the preferred process according to the invention the electrolyte used is sodium carbonate, since this substance is a very effective heat stabiliser for vinyl chloride polymers and copolymers and is also cheap and readily obtainable. The amount of this substance used is limited by its solubility in water, and by the maximum amount of solution which may be added without seriously affecting the properties of the polymeric material.

Addition of sodium carbonate solution and emulsifying agent is effected by adding an aqueous solution containing the sodium carbonate together with the emulsifying agent. It is of course desirable that the dispersion should not be strongly acid before the addition of the sodium carbonate/emulsifying agent solution, otherwise a considerable proportion of the sodium carbonate will be neutralised. Whilst with a weakly acid dispersion the amount of sodium carbonate so neutralised will be very small it may be necessary in some cases to allow for such neutralisation by employing a total amount of sodium carbonate in excess of that required for heat stabilisation.

When vinyl chloride polymer or copolymer dispersions treated in accordance with the process of the invention are submitted to subsequent treatment in order to isolate the solid polymeric material, for example by coagulation or spray-drying, a quantity of diphenyl thiourea is preferably incorporated in the solid polymeric material so obtained, in order to enhance the stabilising effect of the electrolyte stabiliser. This may be accomplished by any convenient process such as, for example, ball milling followed by milling on hot rolls. The latter operation should be kept as short as possible in order to avoid deterioration of the polymeric material. The combination of sodium carbonate as electrolyte heat stabiliser as described above with the diphenyl thiourea additional heat stabiliser is particularly effective in stabilising vinyl chloride polymers and copolymers against the deleterious effects of heat. Products such as sheets obtained by moulding or other processes from polymeric material stabilised in this way have particularly good properties in respect of transparency and freedom from colour.

While the process of the invention is primarily designed for use in connection with polyvinyl chloride it is also of value for copolymers of vinyl chloride with other ethylenically unsaturated compounds such as vinylidene chloride, vinyl esters for example vinyl acetate, acrylic acid and its derivatives, for example methyl methacrylate, ethyl alphachloracrylate and acrylonitrile, styrene, fumarates, for example diethyl fumarate, and maleates, for example diethyl maleate.

The invention is illustrated but in no way limited by the following examples, in which all parts are by weight.

Example 1

A solution consisting of 10 parts water, 1 part sodium carbonate and 1 part of the sodium salt of sulphonated methyl oleate was added to a stirred polyvinyl chloride dispersion obtained by emulsion polymerisation of vinyl chloride having a solid content of 33% and a pH value of 8.5, to effect an addition of 0.5% of sodium carbonate based on the weight of polymer:

The mechanical and electrolyte stabilities of the treated dispersion were equal in all respects to those of untreated dispersion and were much greater than those of dispersion treated with a solution containing the same amount of sodium carbonate without emulsifying agent.

The solid polyvinyl chloride was isolated from the dispersion and was used to prepare plasticised and unplasticised sheets by moulding. These sheets were found to be much more free from colour and more transparent than similar sheets prepared from the solid polyvinyl chloride obtained from untreated dispersion and similar sheets prepared by isolating the solid polyvinyl chloride from untreated dispersion and subsequently incorporating sodium carbonate by mixing on rolls and in a ball mill. These latter were found to be discoloured by a large number of brown spots.

Another batch of the original polyvinyl chloride dispersion was treated with an aqueous solution containing 0.5% of sodium carbonate based on the weight of polyvinyl chloride. This addition of sodium carbonate caused some coagulation of the polymer and the resultant treated dispersion had a much lower mechanical stability than the dispersion treated with the sodium carbonate and emulsifying agent solution. The polymer tended to coagulate during subsequent treatment and the treated dispersion was not suitable for isolation of the polymer by spray-drying in a machine of the rotating-disc type.

Example 2

The process of Example 1 was repeated but replacing the sodium salt of sulphonated methyl oleate by 1 part of a sulphonated naphthalene/formaldehyde condensation product. The results obtained were similar to those obtained in Example 1.

Example 3

The process of Example 1 was again repeated but using 1 part of the ammonium salt of sulphonated oleic acid as the emulsifying agent. Similar results were obtained to those obtained in Example 1.

Example 4

Example 1 was repeated with 1 part of a sulphonated petroleum oil as the emulsifying agent instead of the sodium salt of sulphonated methyl oleate. The results obtained were similar to those described in Example 1.

Example 5

The previous examples were repeated using 1 part of sodium nitrate in place of the sodium carbonate. Similar results were obtained.

Example 6

Examples 1, 2, 3, and 4 were again repeated using 1 part of potassium bicarbonate in place of the sodium carbonate. The results obtained were similar to those obtained in the preceding examples.

Example 7

Examples 1, 2, 3 and 4 were repeated yet again using 1 part of trisodium phosphate in place of the sodium carbonate. The results were again similar to those obtained in the preceding examples.

Example 8

The process of Example 1 was repeated and the solid polyvinyl chloride was isolated from the dispersion obtained after treatment with the sodium carbonate/emulsifying agent solution by means of a spray-drier of the rotating-disc type. 0.5% of diphenylthiourea was then incorporated in the solid polymeric material by ball-milling for 3 hours. The resultant solid polymeric material was used to prepare plasticised and unplasticised sheets by moulding, and the sheets were found to be superior in transparency and freedom from colour to those prepared in accordance with Example 1 without the subsequent addition of diphenyl thiourea.

I claim:

1. A process for the production of an improved composition comprising an aqueous dispersion of a polymeric material selected from the group consisting of polymers of vinyl chloride and copolymers of vinyl chloride with other ethylenically unsaturated compounds, said dispersion containing an electrolyte heat stabilizer for vinyl chloride polymers and copolymers, which comprises mixing an aqueous dispersion of the polymeric material with an aqueous solution containing said electrolyte heat stabilizer and an emulsifying agent.

2. A process for the production of an improved composition as set forth in claim 1 wherein said electrolyte heat stabilizer is sodium carbonate in a proportion of from .1% to 1% by weight of the polymeric material.

3. A process for the production of an improved composition as set forth in claim 1 wherein said emulsifying agent is the sulfonated methyl oleate sodium salt in a proportion of from .1% to 1% by weight of the polymeric material.

4. An aqueous dispersion of a polymeric material selected from the group consisting of polymers of vinyl chloride and copolymers of vinyl chloride with other ethylenically unsaturated compounds, said dispersion containing an electrolyte heat stabilizer for vinyl chloride polymers and copolymers and being of improved stability and obtained by the process claimed in claim 1.

5. A process for the production of an improved composition comprising a solid polymeric material selected from the group consisting of polymers of vinyl chloride and copolymers of vinyl chloride with other ethylenically unsaturated compounds, and an electrolyte heat stabilizer for vinyl chloride polymers and copolymers, which comprises mixing an aqueous dispersion of the polymeric material with an aqueous solution containing said electrolyte heat stabilizer and an emulsifying agent and isolating the solid polymeric material by spray-drying.

6. A process for the production of an improved composition as set forth in claim 5 where said electrolyte heat stabilizer is sodium carbonate in a proportion of from .1% to 1% by weight of the polymeric material.

7. A process for the production of an improved composition as set forth in claim 5 where said emulsifying agent is the sulfonated methyl oleate sodium salt in a proportion of from .1% to 1% by weight of the polymeric material.

8. A composition comprising a solid polymeric material selected from the group consisting of polymers of vinyl chloride and copolymers of vinyl chloride with other ethylenically unsaturated compounds, and an electrolyte heat stabilizer for vinyl chloride polymers and copolymers, said composition being of improved heat stability and obtained by the process claimed in claim 5.

9. A process for the production of an improved composition comprising a solid polymeric material selected from the group consisting of polymers of vinyl chloride and copolymers of vinyl chloride with other ethylenically unsaturated compounds, and an electrolyte heat stabilizer for vinyl chloride polymers and copolymers, which comprises mixing an aqueous dispersion of the polymeric material with an aqueous solution containing said electrolyte heat stabilizer and an emulsifying agent, isolating the solid polymeric material by spray-drying, and incorporating an additional heat stabilizer with the solid polymeric material.

10. A process for the production of an improved composition as set forth in claim 9 wherein said electrolyte heat stabilizer is sodium carbonate in a proportion of from .1% to 1% by weight of the polymeric material.

11. A process for the production of an improved composition as set forth in claim 9 wherein said emulsifying agent is the sulfonated methyl oleate sodium salt in a proportion of from .1% to 1% by weight of the polymeric material.

12. A process for the production of an improved composition as set forth in claim 9 wherein said additional heat stabilizer is diphenyl thiourea in a proportion of from 0.1% to 2% by weight of the polymeric material.

13. A composition comprising a solid polymeric material selected from the group consisting of polymers of vinyl chloride and copolymers of vinyl chloride with other ethylenically unsaturated compounds, and an electrolyte heat stabilizer for vinyl chloride polymers and copolymers, said composition being of improved heat stability and obtained by the process claimed in claim 9.

ALBERT KENNETH SANDERSON.

REFERENCES CITED

The following references are of record in the file of this patent:

UNITED STATES PATENTS

| Number | Name | Date |
|---|---|---|
| 1,814,420 | Tochtermann et al. | July 14, 1931 |
| 2,147,154 | Fikentscher | Feb. 14, 1939 |
| 2,333,280 | Tucker | Nov. 2, 1943 |
| 2,365,400 | Fikentscher | Dec. 19, 1944 |
| 2,365,506 | Alexander | Dec. 19, 1944 |
| 2,404,781 | Arnold et al. | July 30, 1946 |
| 2,410,775 | Cox | Nov. 5, 1946 |
| 2,476,474 | Baer | July 19, 1949 |